United States Patent [19]
Passchier

[11] Patent Number: 5,211,600
[45] Date of Patent: May 18, 1993

[54] PROCESS AND DEVICE FOR BONING CARCASS BELLY PIECES

[76] Inventor: Bob Passchier, Birch Grove House, Cloonagh East, Tullamore, Co., Offaly, Ireland

[21] Appl. No.: 838,209
[22] PCT Filed: Sep. 7, 1990
[86] PCT No.: PCT/NL90/00128
§ 371 Date: Apr. 17, 1992
§ 102(e) Date: Apr. 17, 1992
[87] PCT Pub. No.: WO91/03163
PCT Pub. Date: Mar. 21, 1991

[30] Foreign Application Priority Data
Sep. 8, 1989 [NL] Netherlands ............ 8902252

[51] Int. Cl.⁵ .................................. A22C 17/04
[52] U.S. Cl. ........................ 452/171; 452/135; 452/136
[58] Field of Search ............ 452/171, 135, 136

[56] References Cited

U.S. PATENT DOCUMENTS

| | | | |
|---|---|---|---|
| 3,546,737 | 12/1970 | Neebel et al. | 452/171 |
| 3,771,196 | 11/1973 | Doerfer et al. | 452/171 |
| 3,849,836 | 11/1974 | Bernard | 452/171 |
| 4,134,181 | 1/1979 | Schneider et al. | 452/171 |
| 5,023,975 | 6/1991 | Van Der Horn et al. | 452/135 |

FOREIGN PATENT DOCUMENTS

| | | |
|---|---|---|
| 0319090 | 6/1989 | European Pat. Off. |
| 2425816 | 12/1975 | Fed. Rep. of Germany |
| 2709615 | 11/1977 | Fed. Rep. of Germany |
| 3237936 | 4/1984 | Fed. Rep. of Germany |
| 1570426 | 6/1969 | France |
| 2226933 | 11/1974 | France |
| 2530927 | 2/1984 | France |
| 1-312962 | 12/1989 | Japan |
| 592417 | 10/1977 | Switzerland |

*Primary Examiner*—Willis Little
*Attorney, Agent, or Firm*—Young & Thompson

[57] ABSTRACT

Process and device for boning carcass belly pieces in which the belly piece is clamped by the part free from ribs along a line running essentially parallel to the line joining the inner ends of the ribs to each other, and the part of the belly piece containing the innermost parts of the ribs is supported, so that this part forms an internal angle of approximately 90° with the other part of the belly piece containing no ribs, while the belly piece is moved along in a direction parallel to the said other part thereof and essentially at right angles to the said connecting line, and is guided through under a device which comprises a plurality of bars which, while the belly piece is being passed through the device, exert a force or blow on the meat in between the ribs so that the meat of the unsupported part of the belly piece is bent downwardly and the ribs protrude freely upwardly.

17 Claims, 6 Drawing Sheets fig-1 fig-2 fig-3 fig-4 fig-5 fig-12 fig-6 fig-7 fig-8 fig-9 fig-10 fig-11

PROCESS AND DEVICE FOR BONING CARCASS BELLY PIECES

The invention relates to a process for boning carcass belly pieces or similar pieces which have an inner and outer surface, part of the inner surface having on it a row or more or less encapsulated ribs forming the pieces of bone to be removed, and each extending inwards essentially from a side edge of the belly piece over a part of the inner surface, in which the belly piece is supported at its outer surface and between the ribs a force is exerted on the inner surface, so that the meat is bent away from the ribs and at least the outermost parts of the ribs come away from the meat, following which a force is exerted on these parts of the ribs and the meat is held fast, so that the entire ribs come away from the meat and are then removed.

Carcass belly pieces where hitherto boned one by one entirely by hand, which involves a large amount of work, and thus high costs.

European patent application 0319090 discloses a device for boning belly pieces, in which a belly piece is supported by a flexible and drivable surface passed and guided over a roller over which is also passed a plurality of tensioned cords disposed side by side so that when the belly piece is gradually pulled under the cords these cords are disposed in the depressions between the ribs forcing the meat to follow the guiding roller whereas the ribs do not follow this movement so that their tips protrude between the cords. Further stricker bars are arranged in front of the guiding roller which are driven in a reciprocating movement so that they are capable of exerting a force on the protuding ribs. This device is not suitable for mass production, and a relatively large amount of manual work is still required.

The object of the invention is to produce a process for boning carcass belly pieces or similar pieces which is suitable for far-reaching mechanization and mass production.

This object is achieved through the fact that in the process according to the invention the belly piece is held in such a way and supported at its outer surface that the side part of the belly piece, containing at least the outermost parts of the ribs lying near the said side edge, remains free, whereas only the part of the belly piece containing the innermost parts of the ribs is supported, and this part forms an internal angle of approximately 90° with the other part of the belly piece containing no ribs.

The belly piece is preferably held by clamping the belly piece by the part free from ribs along a line running essentially parallel to the line joining the inner ends of the ribs to each other, while the belly piece is moved along in a direction parallel to the above-mentioned other part thereof and essentially at right angles to the said connecting line, so that the part folded over at an angle of approximately 90° forms the rear end, and is guided through under a device which comprises a plurality of rods or bars which, while the belly piece is being passed through the device, exert a force or blow on the meat in between the ribs so that the meat of the unsupported part of the belly piece is bent downwardly and the ribs protrude freely upwardly.

This means that the outermost end parts of the ribs come away from the meat, so that they can be gripped in order to pull the ribs fully away from the meat.

Advantageously the belly piece is passed through under a grille whose bars running parallel to the direction of movement lie such a short distance from the belly piece that the bent over meat engages the grille and the freely projecting parts of the ribs project upwardly between the bars, said parts being gripped or a blow being exerted on said parts by means which are moved forward at a greater speed than that of the belly piece in the direction of the movement thereof.

It is generally necessary to cut and/or scrape away the membranes covering the ribs, before separating the ribs from the meat. When the membranes have been scraped away, the belly piece can advantageously be conveyed through underneath a number of finger-shaped elements which are designed in such a way that, while the belly piece is being passed through these elements, a force is exerted on the meat between the ribs, as a result of which at the unsupported side part of the belly piece containing the outermost parts of the ribs the meat is bent over and pressed away from the ribs.

The invention also relates to a device for carrying out the process, which is characterized in that the device comprises a drivable conveyor, which has fixed on it, at intervals from each other, a number of essentially plate-shaped bearing elements which during the forward movement of the conveyor are moved parallel to themselves, and which carry at the one, leading end a clamping jaw hingedly connected thereto and at the other, rear end an essentially plate-shaped supporting element which is hingedly connected thereto and can be swung up and down, while above the conveyor a grille is arranged whose bars extend in the direction of movement and parallel thereto, and means capable of bending away the meat from the ribs and means capable of exerting a force on the protruding ribs.

In a first embodiment, above the grille a device is arranged which comprises a number of gripping elements essentially extending to the grille, and means for moving the gripping elements of the conveyor forwards parallel to the grille, in the direction of movement of the conveyor, but at a greater speed than the latter, said means preferably being formed by an endless belt on which the gripping elements are fitted, and each of the gripping elements being formed by a bar which at the free end is provided with an eye.

In a second embodiment a hammer device is provided above the conveyor upstream of the grille, which device comprises a plurality of spaced apart parallel extending rods or bars of which each is mounted for a pivotal movement to a support and extends in the opposite direction with respect to the movement of the conveyor drive means being in engagement with the rods for swinging the rods to and from a belly piece, an ejecting device being provided above the grille which comprises a number of slides which extends across the grille between two endless chains to which they are attached which endless chains can be driven so that their lower runs are advanced in the direction of movement of the conveyor, but at a greater speed than the latter during which movement the slides sweep over the grille at a relative short distance therefrom.

The supporting element advantageously comprises two parts, an inner part connected to the bearing element, and an outer part which is fitted movably relative to the inner part in such a way that it can be moved from a position projecting relative to the inner part, and widening the supporting surface thereof, to a retracted and swung-down position.

In a supporting element designed in this way the two parts of this element can initially together support the whole part of the belly piece containing the ribs, in a position slanting relative to the conveyor, so that it is then possible in an effective manner, by means of a cutting device and/or a scraping device disposed above the conveyor, for the membranes covering the ribs to be cut and/or scraped away.

The invention is explained in greater detail with reference to the drawing, in which.

Figure 1:
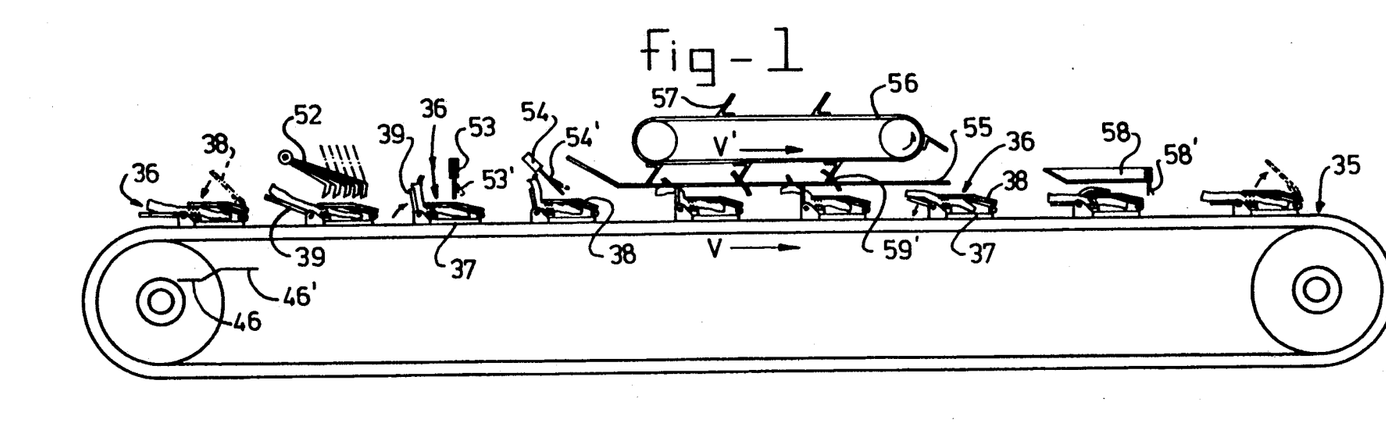
FIG. 1 shows in side view a first embodiment of the device according to the invention.

As shown in FIG. 1, the device comprises a conveyor 35 made up of two flexible elements running parallel to each other, for example endless belts 35'. These belts 35' have fixed on them a number of carrier elements 36, each of which has a plate-shaped bearing element 37, to which a clamping jaw 38 is hingedly fixed at one end and a plate-shaped supporting element 39 is swivellably fixed at the other end. The supporting element 39 has two slidably mounted parts 40, so that when extended these parts 40 widen the supporting face of the supporting element 39 (see FIG. 3).

Figure 3:
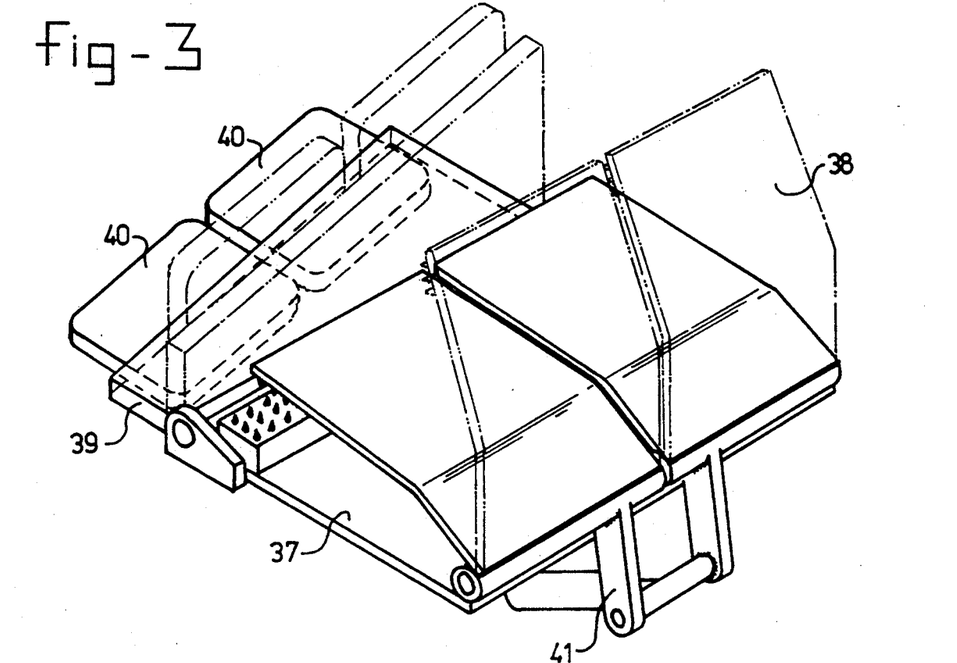
FIG. 3 shows a bearing element of the device in perspective.
Figure 4:
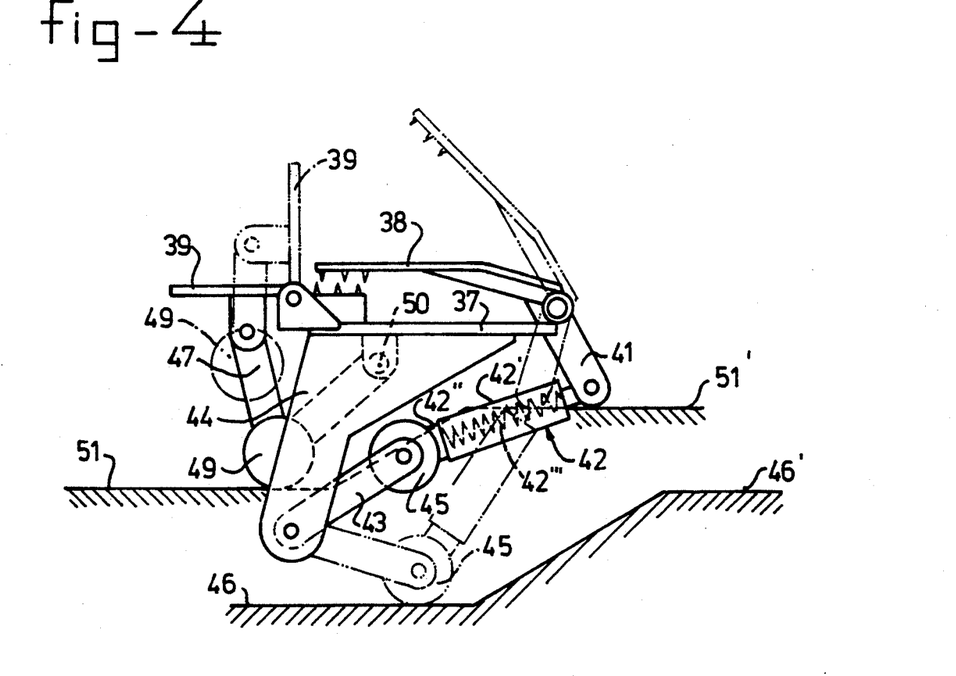
FIG. 4 shows the bearing element in side view.

As shown in FIGS. 3 and 4 in particular, an angle lever, comprising the parts 42 and 43 rotatably connected to each other, is fixed on a projection 41 mounted on the clamping jaw 38, the part 42 being made up of two parts 42' and 42" telescoping into each other, with a spring 42'" between them. The part 43 is rotatably fixed on an arm 44 connected to the bearing element 37, and is connected at the other end to the part 42 with a follower roller 45 between them. It will be clear that, as shown by broken lines in FIG. 4, when the follower roller 45 runs through the positioning curve 46-46', the clamping jaw 38 will be flapped from the position shown by broken lines in FIG. 4 to the position shown by solid lines in FIG. 4, in which position the clamping jaw 38 will clamp a belly piece firmly with spring force.

As also shown in FIG. 4, an arm 47 is rotatably fixed on the part 39, and at the other end is rotatably connected to a second arm 48 with a follower roller 49 between them. The arm 48 is rotatably fixed at 50 on the bearing element 37. When the follower roller 49 passes through the positioning curve 51-51', the supporting element 39 will thus be swung to the position shown by broken lines in FIG. 4.

A scraper device 52 and a finger bar 53 are disposed above the conveyor 35, the finger bar being provided with fingers 53' of an elastic material, for example hard rubber.

Figure 2:
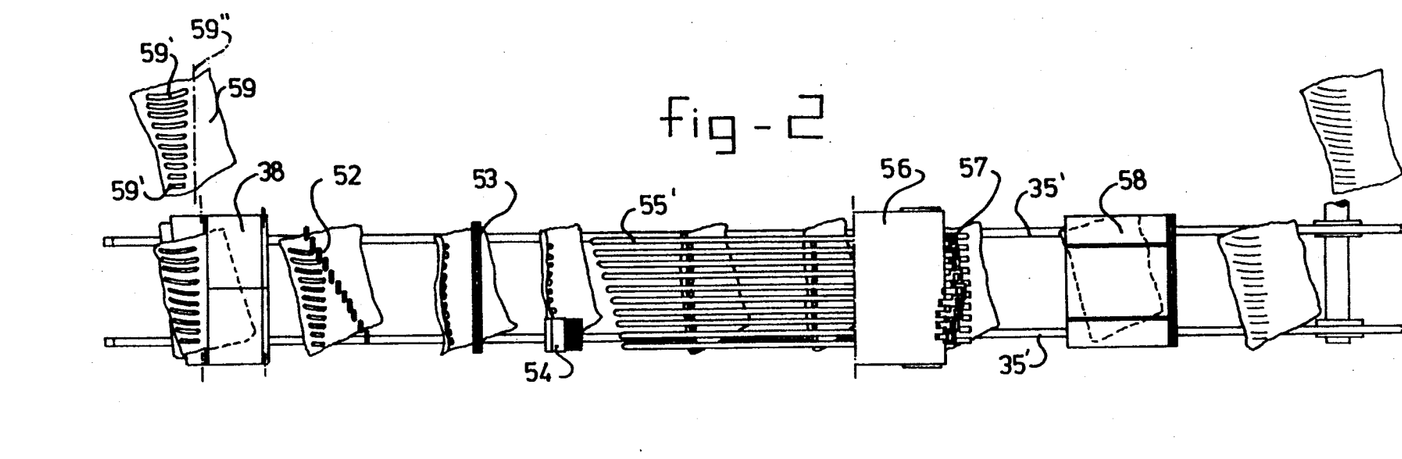
FIG. 2 shows the device of FIG. 1 in top view.

A comb 54, provided with teeth 54' of, for example, spring steel, is also provided above the conveyor 35, said comb 54 being disposed in such a way, as shown in FIG. 2, that the shorter ribs in a belly piece are worked loose by said comb.

Figures 5, 12:
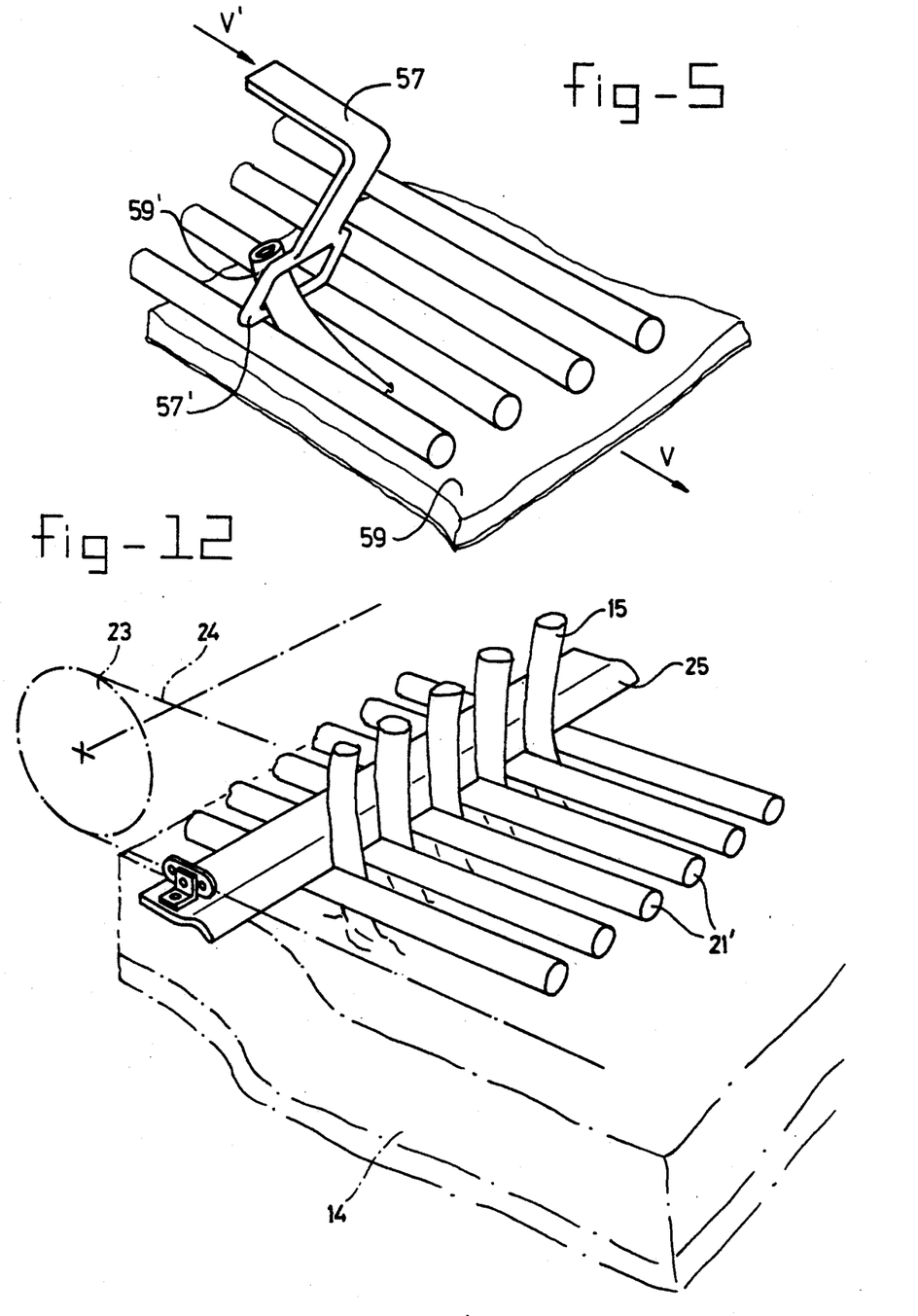
FIG. 5 shows a gripping element in greater detail.
FIG. 12 shows on a larger scale and in perspective one of the slides of the ejecting device above the grille.

A grille 55 is also fitted above the conveyor 35, the bars 55' of said grille running parallel to each other with equal intervals between them. Disposed above this grille is a device in the form of an endless belt 56, said belt 56 having fitted on it a number of projecting gripping elements 57 which, as shown in FIG. 5, are provided with an eye 57' at their free end.

Finally, a device 58 with an end strip 58' of an elastic material, for example hard rubber, is disposed above the conveyor 35.

When the device is in operation, a belly piece 59 is placed on a bearing element 37, in such a way that the inside of the belly piece is turned upwards and the ribs 59' extend approximately in the direction of movement of the conveyor 35, so that the line 59" connecting the inside ends of the ribs 59' to each other is approximately at right angles to the direction of movement of the conveyor 35. Since, shortly afterwards, the follower roller 45 is taken to the higher position 46' of the positioning curve 46-46', the clamping jaw 38 will close, so that the belly piece 59 is firmly clamped along a line running approximately parallel to the connecting line 59", while the part containing the ribs 59' comes to rest on the supporting element 39, this supporting element 39 being widened by the parts 40.

The supporting element 39 is then swung upwards, so that the part of the belly piece containing the ribs 59' comes to rest at an angle relative to the direction of movement of the conveyor 35, and the scraper device 25 can carry out its work, which involves scraping away the membranes covering the ribs 59'.

The supporting element 39 is then swung up further, to a position approximately at right angles to the conveyor 35, the parts 40 being telescoped in, so that the side part of the belly piece containing the outermost parts of the ribs 59 is not supported.

The belly piece then runs through under the finger bar 53, in the course of which the fingers of the bar gripping between the ribs 59' press the meat away from the end parts of the ribs. The belly piece then passes the comb 54, which loosens the shorter ribs 59'.

The belly piece subsequently runs along the grille 55, so that at the above-mentioned unsupported part the meat is bent away by the bars 55' from the ribs 59', and the outer end parts of the ribs 59' project up through between these bars. These outer end parts of the ribs 59' are gripped here by the carriers 57 fitted on the endless belt 56, by these end parts of the ribs 59' being taken up by the eyes 57', as shown in FIG. 5. Since the endless belt 56 is advanced at a speed v' which is greater than the speed V at which the conveyor 35 is advanced, the ribs 59' thus gripped by the carriers 57 are removed from the meat.

The supporting part 39 is then taken into the horizontal position, and the belly piece passes the end strip 58', which presses out any ribs still stuck by their inside ends. Finally, the jaw 38 is opened, and the boned belly piece is removed from the bearing element 36 in question for further handling thereof.

Figure 6:
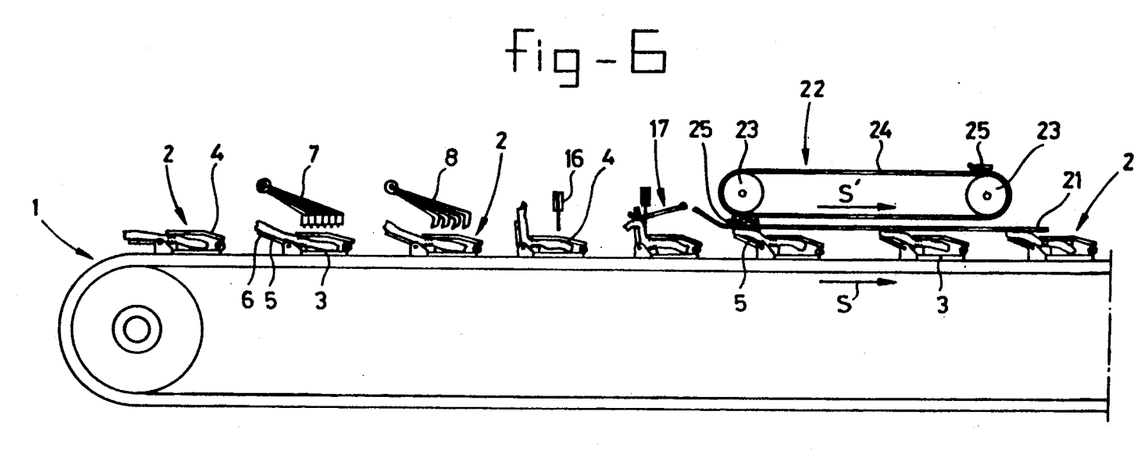
FIGS. 6 and 7 show a second embodiment of the device according to the invention, in side and in top view respectively.
Figure 7:
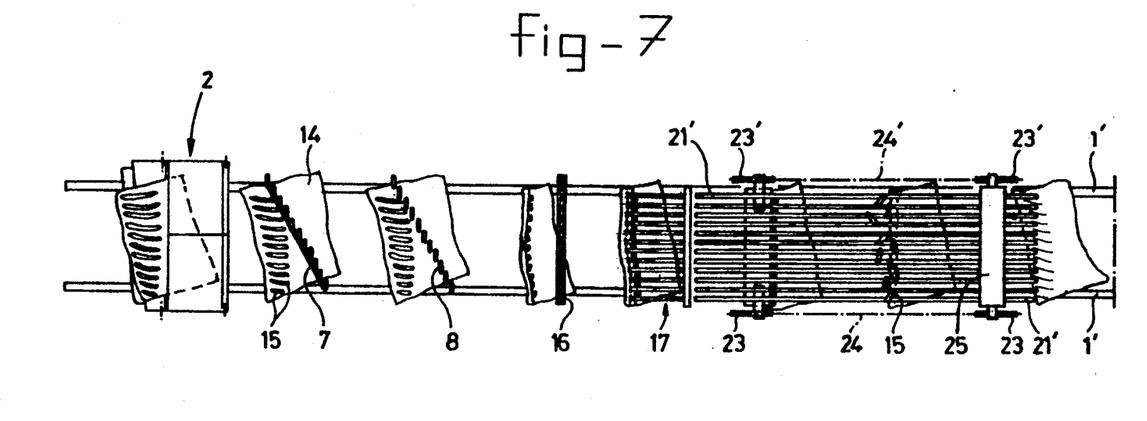

As shown in FIGS. 6 and 7, the device comprises a conveyor 1, which is made up of two flexible elements, for example endless belts 1', running parallel to each other. These belts 1' have fixed on them a number of carrier elements 2, each of which has a plate-shaped bearing element 3, to which a clamping jaw 4 is hingedly fixed at one end and a plate-shaped supporting element 5 is swivellably fixed at the other end. The supporting element 5 comprises an outer part 6 mounted thereon for a swivellable movement about an axis extending perpendicular thereto, which part 6, in its outwardly swung position broadens the supporting element.

A cutting device 7 and a scraper device 8 are disposed above the conveyor 1.

Figure 8:
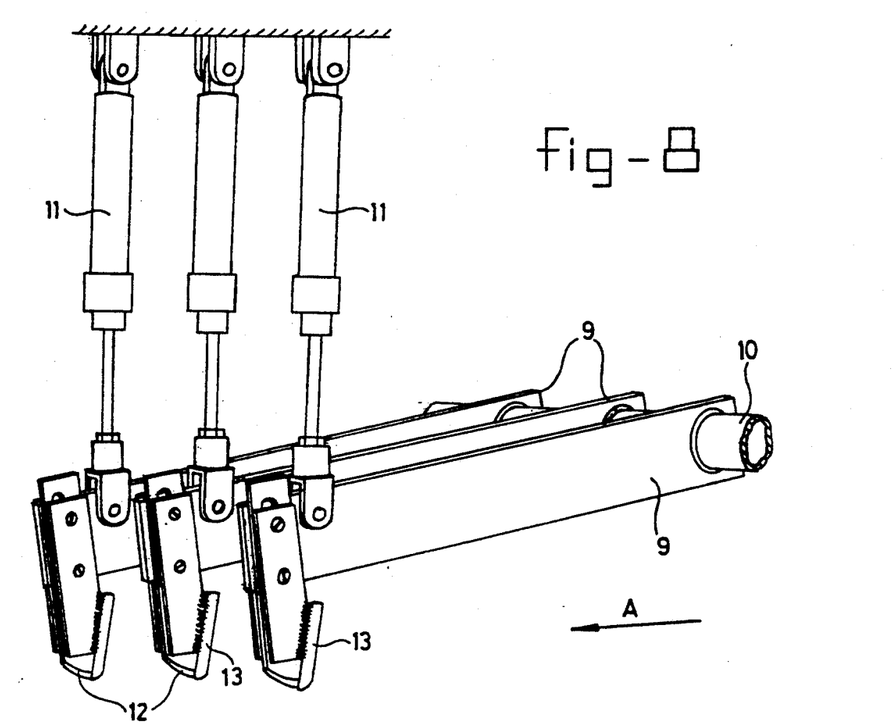
FIG. 8 shows a part of the cutting device in perspective.
Figure 9:
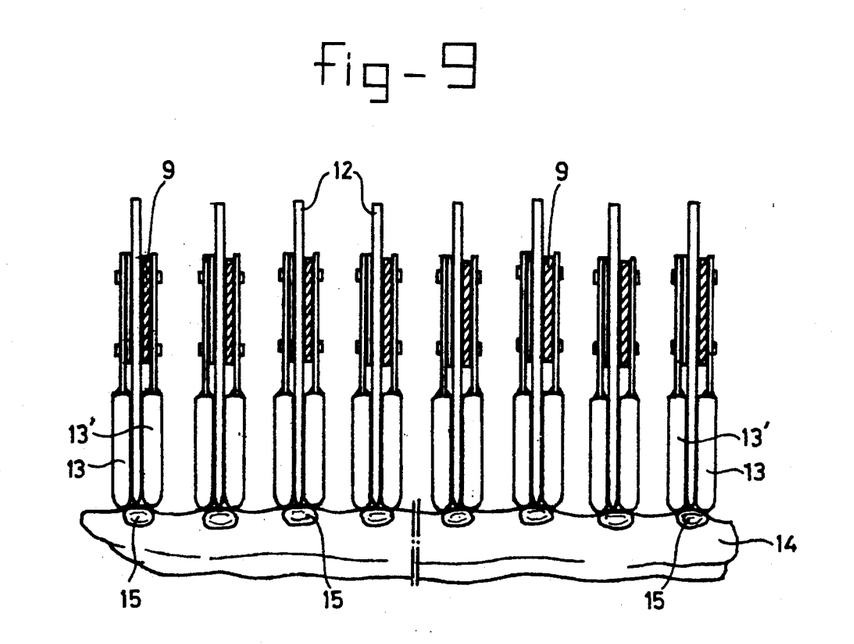
FIG. 9 shows a view in the direction of the arrow A in FIG. 8.

As shown in FIGS. 8 and 9 the cutting device comprises a plurality of arms 9, in the shown embodiment eight arms, of which each is mounted for a pivotal movement about the axis 10 and is capable of being swung up and downwardly by means of the piston-cilinder units 11. Each arm carries at its free end a downwardly projecting knife blade 12 which is positioned between two guiding elements 13, 13'. It appears from FIG. 9 the arms 9 are swung downwardly when a belly piece is arrived at the cutting device so that the knife blades 12 are pressed against the ribs 15 whereby the membranes covering the ribs are cut. The knife blades 12 are thereby centered on the ribs 15 by the guiding elements so that said elements 13, 13' position themselves on either side of a rib 15 and encompass the rib.

By reference numeral 16 is indicated a finger bar which corresponds with the finger bar 50c in FIG. 1.

A hammer device 17 is mounted above het conveyor down stream of the finger bar 16.

Figure 10:
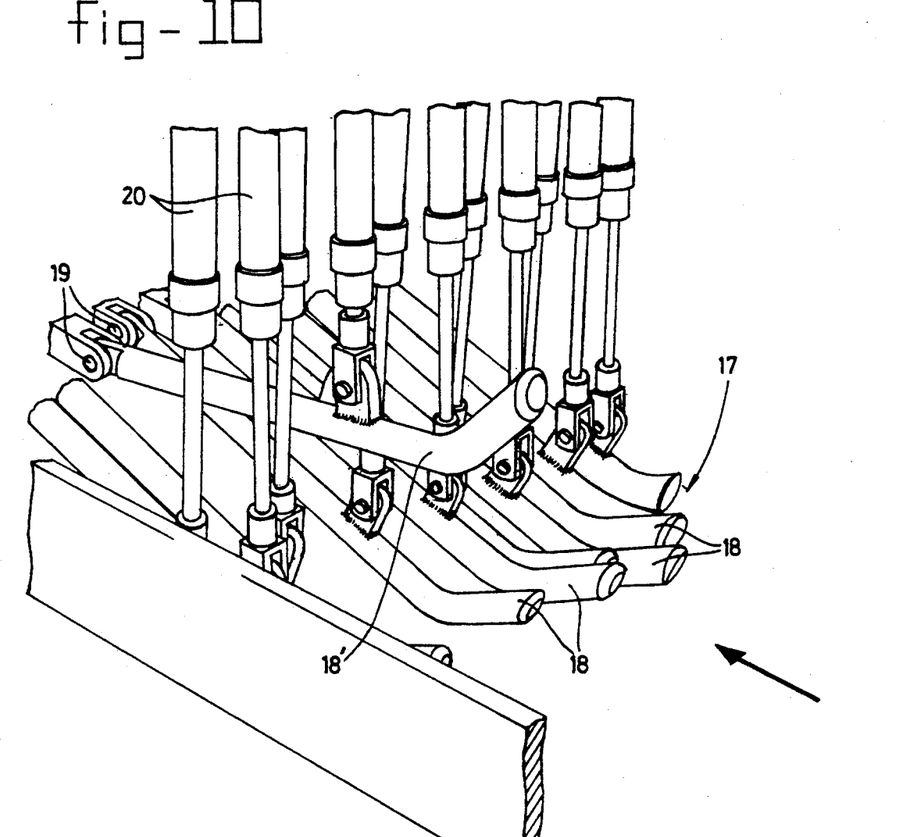
FIG. 10 shows the hammer device in perspective.
Figure 11:
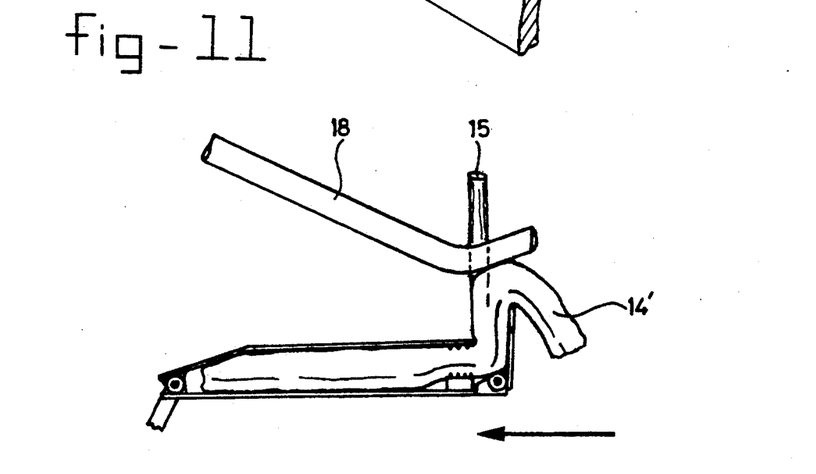
FIG. 11 shows the operation of the hammer device on the basis of one of the hammer elements.

As shown in FIG. 10 the hammer device 17 comprises a plurality of hammer bars 18 of which the free end portions are slightly bent upwardly. Each bar is mounted at 19 for a pivotal movement on a frame and is capable to be swung up and downwardly between a uppermost position shown for the bar 18' and a lowermost position shown for the remaining bars 18 by means of the associated piston-cilinderunit 20. When a belly piece 14 has arrived at the hammer device 17, the supporting element 5 being in its upwardly swung, an angle of approximately 19° forming positions, as shown in FIG. 11, the hammer bars 18 are rapidly and with a great force swung downwardly into two groups after each other, each hammer bar 18 of the one group lying between two hammer bars 18 of the other group. The hammer bars 18 are driven with a great force against the meat 14' between the ribs 15 as shown in FIG. 11 for one of the hammer bars whereby the meat 14' is pressed downwardly around the supporting element 5 and the ribs 15 project freely upwardly after which the hammer bars 18 are swung rapidly to the uppermost position.

With reference numeral 21 is indicated a grille mounted above the conveyor and comprising a plurality parallel extending bars 21'. Above said grille is mounted an ejecting device 22 which comprises two endless chains 24, 24' of which each is passed around two spaced apart sprocket wheels 23, 23' and two or more slides 25 mounted between said chains and extending across the grille so that when the slides pass the lower track of the endless chains, they sweep over the grille with a relative short interspace. The chains 24, 24' are driven so that they go around with a velocity S' which is greater than the velocity S of the conveyor. When a belly piece 40 after having passed the hammer device 17 has arrived underneath the grille 21, bearing element 5 being swung downwardly to a downward upwardly inclined position the freed ribs 15 project upwardly between the rods 21' of the grille 21 whereas the meat 14' is retained by the rods 21' as clearly shown in FIG. 12. By the greater velocity S' of the chains 24 and 24' one of the slides 25 collides with a great force with the projecting ribs of the belly piece whereby these ribs become entirely loose from the meat as shown in FIG. 7.

When the device is in operation, a belly piece 14 is placed on a bearing element 3, in the same manner as explained above with reference to FIGS. 1-5 and the clamping jaw 4 is closed, the portion of the belly piece containing the ribs 15 coming to rest on the supporting element 5 and the outer portion 6 being in its outwardly swung position in which the supporting element 5 is broadened.

Then the supporting element 5 is swung upwardly to a backward upwardly inclining position and the belly piece lying thereon is subjected to the operations of the cutting device 7 and the scraper device 8 which operations have already been described herein above.

Further the supporting element 5 is swung upwardly further to a position substantially perpendicular to the conveyor 1, the portion 6 being displaced inwardly so that the side portion of the belly piece containing the outermost portions of the ribs 15 is not supported.

The belly piece then runs through the finger bar 16, in the course of which the fingers of the bar gripping between the ribs place the meat away from the end parts of the ribs.

Then the belly piece 15 arrives at the hammer device 17 of which the operation has been explained already herein above.

The supporting element 5 is then placed again in its backwards inclined position after which the belly piece is moved underneath the grille 21 with the result that the ribs 15 are removed by the ejecting device 22 as indicated herein above.

Finally the jaw 4 is opened and the boned belly piece is removed from the bearing element 2 for further handling thereof.

I claim:

1. Process for boning carcass belly pieces (14; 59) or similar pieces which have an inner and outer surface, part of the inner surface having on it a row of more or less encapsulated ribs (15; 59') forming the pieces of bone to be removed, and each extending inwards essentially from a side edge of the belly piece over a part of the inner surface, in which the belly piece is supported at its outer surface and between the ribs a force is exerted on the inner surface, so that the meat is bent away from the ribs and at least the outermost parts of the ribs come away from the meat, following which a force is exerted on these parts of the ribs and the meat is held fast, so that the entire ribs come away from the meat and then are removed, characterized in that the belly piece (14; 59) is held in such a way and supported at its outer surface that the side part of the belly piece, containing at least the outermost parts of the ribs lying near the said side edge, remains free whereas only the part of the belly piece containing the innermost parts of the ribs is supported, and this part forms an internal angle of approximately 90° with the other part of the belly piece containing no ribs.

2. Process according to claim 1, characterized in that the belly piece is held by clamping the belly piece by the part free from ribs along a line (59") running essentially parallel to the line joining the inner ends of the ribs to each other.

3. Process according to claim 1, characterized in that the belly piece (14) is moved along in a direction parallel to the above-mentioned other part thereof and essentially at right angles to the said connecting line (59''), so that the part folded over at an angle of approximately 90° forms the rear end, and is guided through under a device (17) which comprises a plurality of rods or bars (18) which, while the belly piece is being passed through the device, exert a force or blow on the meat in between the ribs (15) so that the meat of the unsupported part of the belly piece is bent downwardly and the ribs protrude freely upwardly.

4. Process according to claim 3, characterized in that, the belly piece is passed through under a grille (21; 55) whose bars (21'; 55') running parallel to the direction of movement lie such a short distance from the belly piece that the bent over meat engages the grille and the freely projecting parts of the ribs project upwardly between the bars, said parts being gripped or a blow being exerted on said parts by means (24, 25; 56, 57) which are moved forward at a greater speed than that of the belly piece in the direction of movement thereof.

5. Process according to claim 1, characterized in that the membranes covering the ribs are cut (7) and scraped away (8; 25) before the ribs are separated from the meat.

6. Process according to claim 5, characterized in that when the membranes have been scraped away, the belly piece is conveyed through underneath a number of finger-shaped elements (16; 53) which are designed in such a way that, while the belly piece is being passed through these elements, a force is exerted on the meat between the ribs, as a result of which at the unsupported side part of the belly piece containing the outermost parts of the ribs the meat is bent over and pressed away from the ribs.

7. Device for boning carcass belly pieces (14; 59) or similar pieces which have an inner and outer surface, part of the inner surface having on it a row of more or less encapsulated ribs (15; 59') forming the pieces of bone to be removed, and each extending inwards essentially from a side edge of the belly piece over a part of the inner surface, characterized in that the device comprises a drivable conveyor (1; 35) which has fixed on it, at intervals from each other, a number of essentially plate-shaped bearing elements (3; 37) being movable in translation during the forward movement of the conveyor, and which carry at the one, leading end a clamping jaw (4; 38) hingedly connected thereto and at the other, rear end an essentially plate-shaped supporting element (5; 39) which is hingedly connected thereto and can be swung up and down, while above the conveyor a grille (21; 55) is arranged whose bars extend in the direction of movement and parallel thereto, and means (17; 55) capable of bending away the meat from the ribs and means (22; 56, 57) capable of exerting a force on the protruding ribs.

8. Device according to claim 7, characterized in that upstream of the grille (21) a hammer device (17) is fitted above the conveyor which comprises a plurality of spaced apart parallel extending rods or bars (18) of which each is mounted at their one end for a pivotal movement to a support and extends from said end in the opposite direction with respect to the direction of movement of the conveyor, drive means being in engagement with the rods for swinging the rods to and from a belly piece.

9. Device according to claim 7, characterized in that above the grille (21; 55) a device (22; 56) is arranged which comprises a number of gripping elements (25; 57) essentially extending to the grille, and means for moving the gripping elements forwards parallel to the grille, in the direction of movement of the conveyor, but at a greater speed than the latter.

10. Device according to claim 9, characterized in that said means (24; 56) are formed by at least one endless belt or chain on which the gripping elements are fitted.

11. Device according to claim 9, characterized in that each of the gripping elements is formed by a slide (25) which extends across the grille between two endless chains (24) to which the slide is attached.

12. Device according to claim 9, characterized in that each of the gripping elements if formed by a bar (57) which at the free end is provided with an eye (57').

13. Device according to claim 7, characterized in that the supporting element (5; 39) comprises two parts, an inner part (5; 39) connected to the bearing element, and an outer part (6; 40) which is fitted movably relative to the inner part in such a way that it can be moved from a position projecting relative to the inner part, and widening the supporting surface thereof, to a retracted or swung-down position.

14. Device according to claim 13, characterized in that a scraper device (8; 52) is disposed above the conveyor, downstream of the grille (55) or the hammer device (17).

15. Device according to claim 14, characterized in that a cutting device (7) is provided above the conveyor, upstream of the scraper device (8).

16. Device according to claim 15, characterized in that a cutting device (7) comprises a plurality of spaced apart parallel extending arms (9) mounted for a swinging movement of which each is provided at its free end with a knife blade (12) which projects downwardly and which is disposed between two guiding elements (13) which also project downwardly.

17. Device according to claim 7, characterized in that a finger bar (16; 53) with fingers (53') of an elastic material projecting in the direction of the conveyor is fitted upstream of the grille (55) or the hammer device (17).

* * * * *